US012715145B2

(12) United States Patent
Holden

(10) Patent No.: US 12,715,145 B2
(45) Date of Patent: Aug. 25, 2026

(54) ROBOT DRILLING CLAMP

(71) Applicant: True Position Robotics Limited, Lichfield (GB)

(72) Inventor: Roger Holden, Lichfield (GB)

(73) Assignee: TRUE POSITION ROBOTICS LIMITED, Lichfield (GB)

( * ) Notice: Subject to any disclaimer, the term of this patent is extended or adjusted under 35 U.S.C. 154(b) by 1008 days.

(21) Appl. No.: 17/913,582

(22) PCT Filed: Mar. 25, 2021

(86) PCT No.: PCT/GB2021/050723
§ 371 (c)(1),
(2) Date: Sep. 22, 2022

(87) PCT Pub. No.: WO2021/191610
PCT Pub. Date: Sep. 30, 2021

(65) Prior Publication Data
US 2023/0219240 A1 Jul. 13, 2023

(30) Foreign Application Priority Data
Mar. 25, 2020 (GB) ..................................... 2004306

(51) Int. Cl.
*B25J 15/02* (2006.01)
*B23B 49/00* (2006.01)
(Continued)

(52) U.S. Cl.
CPC ........... *B25J 15/0253* (2013.01); *B23B 49/00* (2013.01); *B25J 11/0055* (2013.01); *B25J 13/085* (2013.01)

(58) Field of Classification Search
CPC .. B25J 15/0253; B25J 11/0055; B25J 13/085; B23B 49/00
(Continued)

(56) References Cited

U.S. PATENT DOCUMENTS 4,955,119 A * 9/1990 Bonomi ............... B25J 15/0019 901/41
4,995,148 A * 2/1991 Bonomi ................... B21J 15/14 414/730
(Continued)

FOREIGN PATENT DOCUMENTS

DE 10 2017213717 * 2/2019
DE 102017213717 A1 2/2019
(Continued)

OTHER PUBLICATIONS

GB Search Report dated Aug. 26, 2020, for corresponding GB Application No. 2004306.3.
(Continued)

*Primary Examiner* — Paul T Chin
(74) *Attorney, Agent, or Firm* — David D. Brush; Westman, Champlin & Koehler, P.A.

(57) ABSTRACT

A clamp for a robotic drill and related method and system for robotic drilling of a component. The clamp attaches to a drilling tool of a robotic drill. The clamp includes: an attachment portion configured for attachment to the drilling tool; a frame linearly moveable relative to the attachment portion along a central axis of the clamp parallel to a drilling direction of the drilling tool; an actuation mechanism including a servo motor configured to drive linear movement of the frame relative to the drilling tool; a workpiece contacting portion at a distal end of the frame, including a surface for contacting a surface of a workpiece to be drilled and an aperture allowing for passage of a drill bit of the drilling tool through to the workpiece surface; and a force sensor arranged to measure a force acting on the workpiece contacting portion in the drilling direction.

13 Claims, 6 Drawing Sheets

(51) Int. Cl.
*B25J 11/00* (2006.01)
*B25J 13/08* (2006.01)

(58) Field of Classification Search
USPC ........................................................ 294/119.1
See application file for complete search history.

(56) References Cited

U.S. PATENT DOCUMENTS

| | | | | |
|---|---|---|---|---|
| 9,101,026 | B2 * | 8/2015 | Ivey | F21K 9/278 |
| 11,938,553 | B2 * | 3/2024 | Ono | B23D 75/005 |
| 11,992,909 | B2 * | 5/2024 | Matsuo | B23Q 11/005 |
| 2006/0227210 | A1 | 10/2006 | Raab et al. | |
| 2008/0209712 | A1 | 9/2008 | Bisiach | |
| 2010/0170100 | A1 * | 7/2010 | Weigel | B25H 7/04 29/428 |
| 2014/0348603 | A1 | 11/2014 | Miyajima et al. | |
| 2017/0075116 | A1 * | 3/2017 | Gardiner | G02B 27/017 |
| 2019/0193167 | A1 | 6/2019 | Horiuchi et al. | |
| 2021/0025692 | A1 * | 1/2021 | Nahum | G01B 11/005 |
| 2025/0205895 | A1 * | 6/2025 | Holden | B23B 49/00 |

FOREIGN PATENT DOCUMENTS

| | | | |
|---|---|---|---|
| EP | 1189022 | A1 | 3/2002 |
| EP | 2808110 | A1 | 12/2014 |
| EP | 3508313 | A1 | 7/2019 |
| WO | 2012012078 | A2 | 1/2012 |

OTHER PUBLICATIONS

International Search Report and Written Opinion dated Jun. 24, 2021 for corresponding International Application No. PCT/GB2021/050723, filed Mar. 25, 2021.

United Kingdom Examination Report under Section 18(3) dated Sep. 19, 2023 for corresponding Great Britain Application No. 2004306.3, filed Mar. 25, 2020.

* cited by examiner

ROBOT DRILLING CLAMP

CROSS-REFERENCE TO RELATED APPLICATIONS

This Application is a Section 371 National Stage Application of International Application No. PCT/GB2021/050723, filed Mar. 25, 2021, which is incorporated herein by reference in its entirety and published as WO 2021/191610 A1 on Sep. 30, 2021, in English.

FIELD OF THE INVENTION

The invention relates to a clamp for a robotic drill, and to a related method and system for robotic drilling of a component.

BACKGROUND

In high precision robotic drilling applications, for example in the aerospace industry, numerous holes may need to be drilled at various precisely defined locations in a component. The holes may need to be oriented at different angles as well as different positions, so a drilling tool having multiple axes of movement may be required. A robotic arm equipped with a drilling tool may be used for this purpose. While such robotic arms can achieve reasonable degrees of accuracy due to feedback from internal encoders on each joint, positional errors may occur in three main different ways. FIG. 1 illustrates the origin of three different types of possible errors in a robotic arm. Kinematic errors (FIG. 1*a*)) result in positional or rotational errors at each joint. Compliance and process forces (FIG. 1*b*)) result in errors arising from forces on the robotic arm that create displacement without necessarily resulting in any movement being measured. Backlash, or lost motion, errors (FIG. 1*c*)) result from slack being taken up in various gearing throughout the robotic arm. Each of these types of error may combine to result in a reduced positional and orientation accuracy when using a robotic arm for a drilling operation.

In robotic drilling operations, a clamp may be used to ensure that a drilling tool is held in position against a component to be machined. The clamp may be pneumatically actuated, applying a high pressure against the workpiece. The pressure can force the drill out of its intended position, leading to inaccurate positioning. In addition, such pressures may cause damage to the workpiece, which may not be evident if for example the workpiece is formed of a composite material.

SUMMARY OF THE INVENTION

In accordance with a first aspect there is provided a clamp configured for attachment to a drilling tool of a robotic drill, the clamp comprising:

- an attachment portion configured for attachment to the drilling tool;
- a frame linearly moveable relative to the attachment portion along a central axis of the clamp concentric with a drilling direction of the drilling tool;
- an actuation mechanism comprising a servo motor configured to drive linear movement of the frame relative to the drilling tool;
- a workpiece contacting portion at a distal end of the frame, comprising a surface for contacting a surface of a workpiece to be drilled and an aperture allowing for passage of a drill bit of the drilling tool through to the workpiece surface; and
- a force sensor arranged to measure a force acting on the workpiece contacting portion in the drilling direction.

An advantage is that the combination of a servo motor driven actuation mechanism with a force sensor enables a controlled clamping force to be applied to the workpiece to be machined, reducing or controlling positioning errors that may otherwise result.

The workpiece contacting portion may have a non-slip surface for contacting the workpiece surface. The non-slip surface may for example comprise a rubber layer or coating. The rubber may for example be neoprene. Such a non-slip surface further reduces the possibility of the drilling tool moving out of position during a clamping operation.

The frame may have a C-shape, having a pair of arms extending in the drilling direction on either side of the central axis and a distal end piece extending between the pair of arms. The arms and end piece may be of unitary construction. The frame having a C-shape prevents deflection, distortion and/or skidding of the frame when the surface of the workpiece contacting portion contacts the workpiece and a clamping force is applied.

The servo motor may be configured to drive each of the arms of the C-shaped frame by rotation of respective rods extending along each arm. Rotation of the rods may be synchronised by a pulley or timing belt extending between the pair of arms. Synchronising rotation of the rods enables the frame to be actuated so that the force applied at the workpiece contacting portion is concentric with the drilling direction.

In accordance with a second aspect there is provided a robotic drilling system, comprising:

- a robotic drill having a drilling tool;
- a workpiece holder for holding a workpiece to be machined;
- a clamp according to the first aspect attached to the drilling tool; and
- a controller connected and arranged for control of the robotic drill and clamp, wherein the controller is configured to:

- actuate the robotic drill to contact the surface of the workpiece contacting portion of the clamp with a workpiece to be machined;
- actuate the servo motor to drive the clamp on to the workpiece while measuring a force from the force sensor until a predetermined force has been reached; and operate the drilling tool to drill a hole into the workpiece.

The robotic drilling system may comprise a metrology system for measuring a position of the drilling tool relative to the workpiece to be machined. The metrology system may comprise a first plurality of datums located on the robotic drill and a second plurality of datums located on the workpiece holder. The controller may be configured to receive signals from the first and/or second plurality of datums to determine a position of the drilling tool relative to the workpiece.

The metrology system may be an optical metrology system, and the first and second plurality of datums may comprise optical emitters. The metrology system may comprise a plurality of optical sensors arranged to determine a position of the tool relative to the workpiece holder based on signals received by the optical sensors from the first and second plurality of optical emitters.

In a first mode, the controller may be configured to:

actuate the robotic drill to contact the surface of the workpiece contacting portion of the clamp with a predetermined location on the workpiece to be machined;

measure a first position of the drilling tool relative to the workpiece with the metrology system;

actuate the servo motor to drive the clamp on to the workpiece while measuring a force from the force sensor until a predetermined force has been reached;

measure a second position of the drilling tool relative to the workpiece with the metrology system;

determine a bias from a difference between the first and second measured positions; and store the determined bias for the predetermined location.

The controller may be configured to determine and store a bias for a plurality of predetermined locations on the workpiece.

In a second mode, the controller may be configured to:

retrieve a stored bias for a predetermined location of a workpiece to be machined;

actuate the robotic drill to contact the surface of the workpiece contacting portion of the clamp at the predetermined location offset by the retrieved bias;

actuate the servo motor to drive the clamp on to the workpiece while measuring a force from the force sensor until a predetermined force has been reached; and operate the drilling tool to drill a hole at the predetermined location of the workpiece.

The controller may be configured to measure a position of the drilling tool after actuating the servo motor and to update the stored bias for the predetermined location. The system may thereby be continually updated during drilling operations to maintain positional accuracy.

The use of the metrology system to determine a bias for each location on the workpiece to be machined allows an offset correction or bias to be made that is specific to each location, since different locations on a complex workpiece will result in different compliances coming into play on the robotic drill. For a robotic arm, for example, the compliance will differ depending on the orientation of the arm relative to the workpiece holder. By operating the robotic drilling system in the first mode, which may be run without any drilling operations taking place, a set of biases for each predetermined location where drilling is to take place can be determined for a given workpiece, which can be applied for subsequent workpieces of nominally identical structure, thereby improving overall accuracy and repeatability.

According to a third aspect there is provided a computer-implemented method for operating a robotic drill, the method comprising, in a first mode:

actuating the robotic drill to contact a surface of a workpiece contacting portion of a clamp attached to a drilling tool of the robotic drill with a predetermined location on the workpiece to be machined;

measuring a first position of the drilling tool relative to the workpiece with a metrology system;

actuating a servo motor to drive the clamp on to the workpiece while measuring a force from a force sensor until a predetermined force has been reached;

measuring a second position of the drilling tool relative to the workpiece with the metrology system;

determining a bias from a difference between the first and second measured positions; and storing the determined bias for the predetermined location.

The first mode of the method may be repeated for a plurality of predetermined locations on the workpiece.

The method may further comprise, in a second mode:

retrieving a stored bias for a predetermined location of a workpiece to be machined;

actuating the robotic drill to contact the surface of the workpiece contacting portion of the clamp at the predetermined location offset by the retrieved bias;

actuating the servo motor to drive the clamp on to the workpiece while measuring a force from the force sensor until a predetermined force has been reached; and operating the drilling tool to drill a hole at the predetermined location of the workpiece.

The second mode of the method may be repeated for the predetermined locations on the workpiece.

According to a fourth aspect there is provided a method for operating a robotic drill, the method comprising:

retrieving a stored bias for a predetermined location of a workpiece to be machined;

actuating a robotic drill to contact a surface of a workpiece contacting portion of a clamp attached to a drilling tool of the robotic drill at the predetermined location offset by the retrieved bias;

actuating a servo motor to drive the clamp on to the workpiece while measuring a force from the force sensor until a predetermined force has been reached; and operating the drilling tool to drill a hole at the predetermined location on the workpiece.

The method may be repeated for a plurality of predetermined locations on the workpiece.

According to a fifth aspect there is provided a computer program comprising instructions for causing a computerised controller to perform the method according to the third or fourth aspects. The computer program may be recorded on a non-transitory storage medium.

BRIEF DESCRIPTION OF THE DRAWINGS

The invention is described in further detail below by way of example and with reference to the accompanying drawings, in which.

DETAILED DESCRIPTION OF ILLUSTRATIVE EMBODIMENTS

FIGS. 1*a*), 1*b*) and 1*c*) show a robotic arm 100, illustrating different sources of positional inaccuracy, as described in the background section above.

Figure 1:
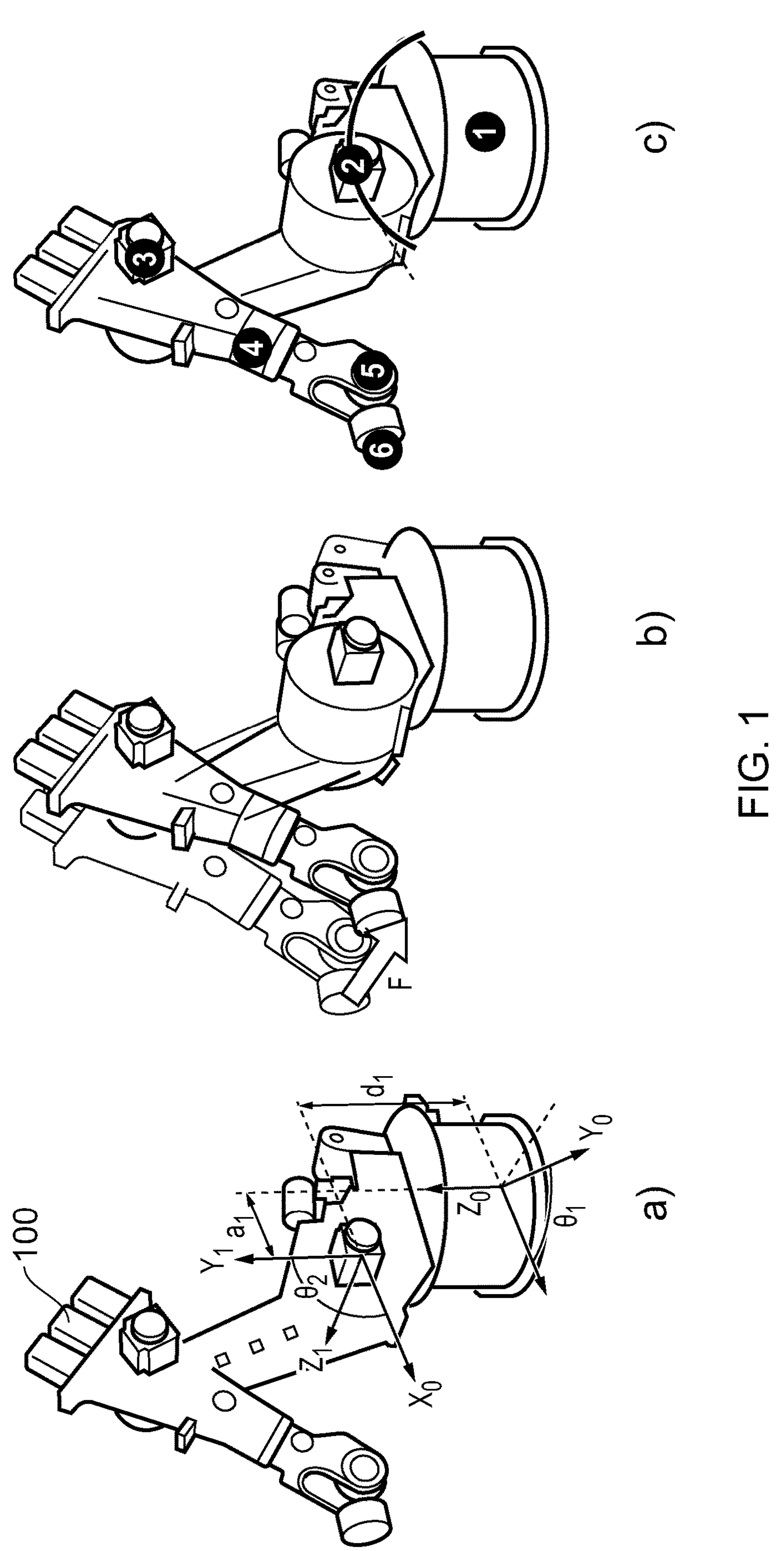
FIG. 1 is a schematic diagram illustrating three different types of positioning errors in a robotic arm.
Figure 2:
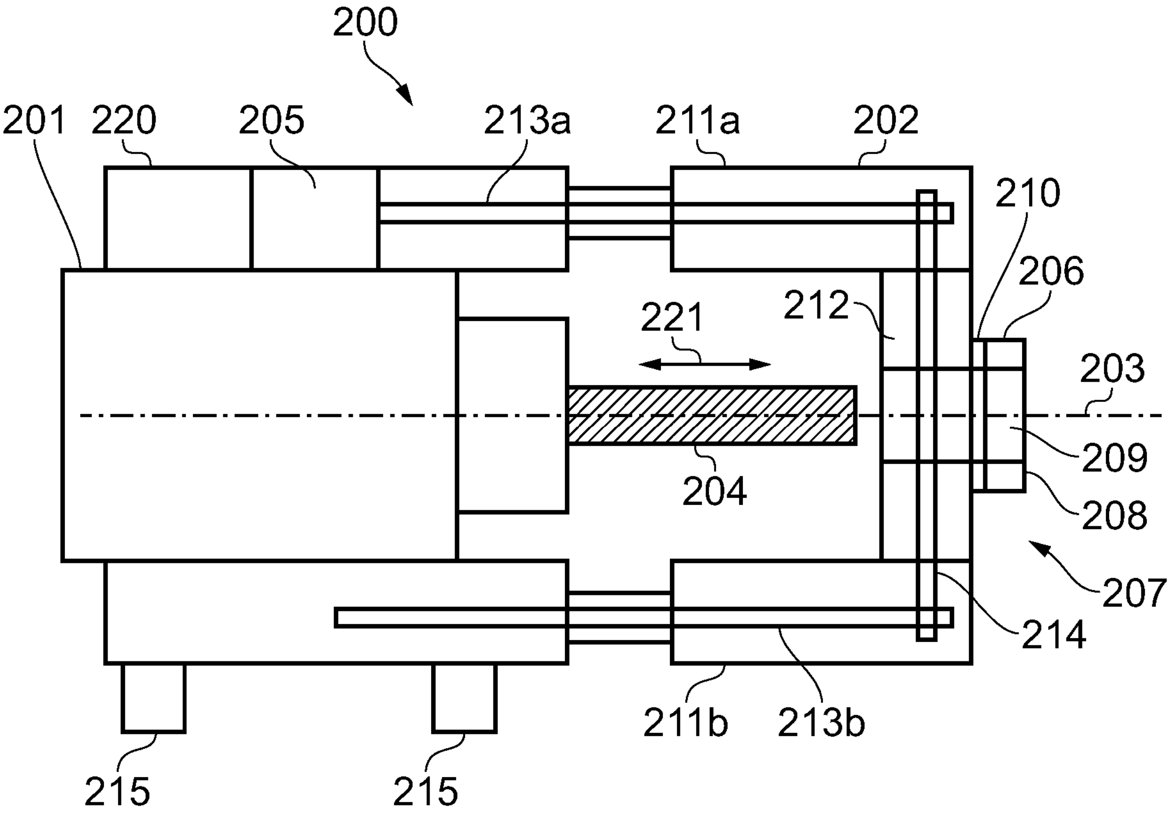
FIG. 2 is a schematic sectional view of an example clamp attached to a drilling tool.

FIG. 2 is a schematic drawing of an example clamp 200 configured for attachment to a drilling tool 201 of a robotic drill, which may for example comprise a robotic arm of the type shown in FIG. 1. The clamp 200 comprises an attachment portion 220 for attachment to the drilling tool 201, and a frame 202 that is linearly moveable relative to the attachment portion 220 along a central axis 203 of the drilling tool 201, i.e. along a rotational axis of a drill bit 204 attached to the drilling tool 201. The drilling tool 201 is configured to drill a workpiece by actuating the drill bit 204 along the central axis 203 in the direction indicated by arrow 221.

The clamp 200 comprises an actuation mechanism comprising a servo motor 205 configured to drive linear movement of the frame 202 relative to the attachment portion 220, i.e. relative to the drilling tool 201. A workpiece contacting portion 206 at a distal end 207 of the frame 202 comprises a surface 208 for contacting a surface of a workpiece to be drilled and an aperture 209 allowing for passage of the drill bit 204 through to the workpiece surface.

A force sensor 210 is arranged to measure a force acting on the workpiece contacting portion 206 in the drilling direction. The force sensor 210 may for example form part of the workpiece contacting portion 206 or may be provided elsewhere in the frame 200 or attachment portion 220 to measure a force acting along the central axis 203 between the workpiece and the drilling tool 201.

The workpiece contacting portion 206 may have a non-slip surface 208 for contacting the workpiece.

The frame 202 in the example of FIG. 2 generally has a C-shape, with a pair of arms 211*a*, 211*b* extending in the drilling direction on either side of the central axis 203 and a distal end piece 212 extending between the pair of arms 211*a*, 211*b*. The arms 211*a*, 211*b* and the distal end piece 212 may be of unitary construction, for example formed of a single piece of metal, to aid stiffness and prevent distortion of the frame 202 during use. Other shapes may also be possible, and the frame 202 may have more than two arms 211*a*, 211*b*.

The servo motor 205 drives each of the arms 211*a*, 211*b* of the frame 202 by driving respective rods 213*a*, 213*b* extending along each arm 211*a*, 211*b*. A pulley or timing belt 214 extends between the pair of arms 211*a*, 211*b* across the distal end section 212, allowing for the rotation of the rods 213*a*, 213*b* to be synchronised so that the frame 202 moves in a uniform linear direction along the central axis 203, thereby applying a force on the workpiece parallel with the drilling direction.

A plurality of datums 215 may be provided, which may be attached to the part of the clamp that is secured to the drilling tool 201, i.e. the attachment portion 220, to allow for a metrology system to determine a location of the drilling tool 201, described in further detail below. Typically at least three datums 215 will be required to enable a precise location and orientation in three-dimensional space to be determined.

Figure 3:
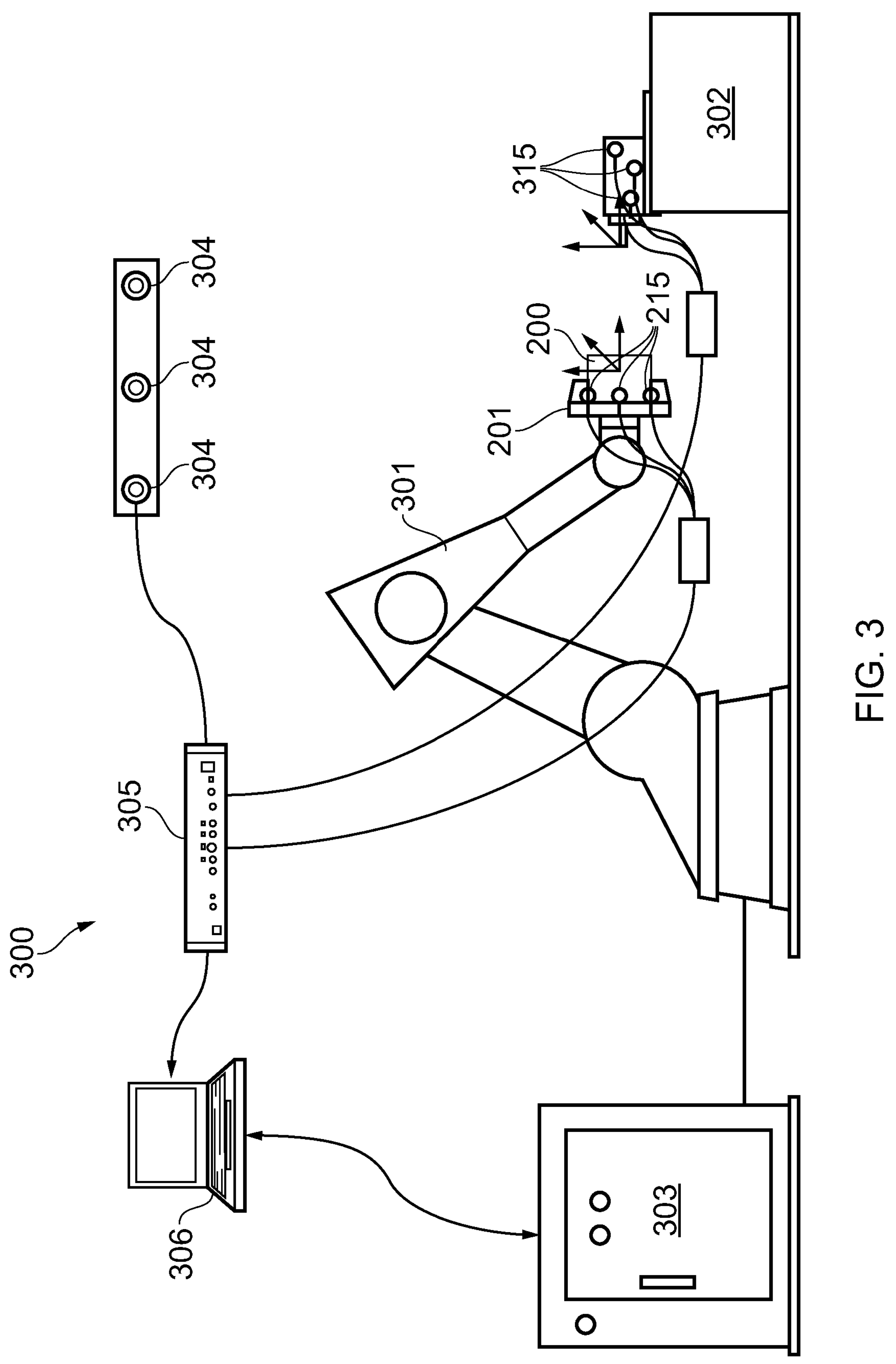
FIG. 3 is a schematic diagram of an example robotic drilling system.

FIG. 3 illustrates schematically an example robotic drilling system 300. The system 300 comprises a robotic drill 301 comprising a drilling tool 201, on to which a clamp 200 of the type described above is attached. A workpiece holder 302 is provided for holding a workpiece (not shown) to be machined. A controller 303 is connected to the robotic drill 301 for control of the robotic drill 301 and clamp 200. The controller 303 actuates the robotic drill 301 to contact the surface of the workpiece contacting portion 208 (FIG. 2) to the surface of a workpiece to be machined and actuates the servo motor 205 in the clamp 200 to drive the clamp 200 on to the workpiece while measuring a force from the force sensor 206 until a predetermined force has been reached. The controller 303 may then operate the drilling tool 201 to drill a hole into the workpiece.

The system 300 may comprise a metrology system for measuring a position of the drilling tool 201 relative to the workpiece to be machined. The metrology system comprises a first plurality of datums 215 on the robotic drill 301, specifically on the part of the clamp 200 that is attached to the drilling tool 201, i.e. the attachment portion 220, and a second plurality of datums 315 on the workpiece holder 302. Each plurality of datums 215, 315 comprises at least three datums to enable accurate positioning and orientation of the workpiece holder 302 and drilling tool 201 in three-dimensional space relative to each other. The datums 215, 315 may for example be light emitting elements, for example light emitting diodes. A plurality of light detecting elements 304 may be arranged to receive light from each of the light emitting elements 215, 315, signals from which are received by a metrology control unit 305. The metrology control unit 305 also controls operation of the light emitting elements 215, 315. The metrology control unit 305 may provide position information to a computer 306, which also communicates with the controller 303.

Although the controller 303, computer 306 and metrology control unit 305 are illustrated as separate components in FIG. 3, these components may be contained in, or considered as being, a single controller, or a controller may be considered to be distributed between and among the different functional components 303, 306, 305.

The metrology system allows the robotic drilling system 300 to measure the relative locations of the drilling tool 201 and workpiece holder 302, thereby allowing the controller 303 to compensate for any difference in location of the drilling tool 201 after actuation of the clamp 200 before a drilling operation. This may for example be carried out during each drilling operation or may be carried out prior to performing any drilling operations on a workpiece.

Figure 4:
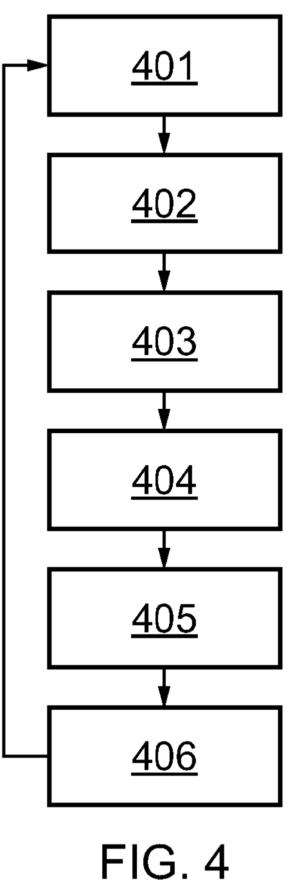
FIG. 4 is a schematic flow diagram of an example method of operating a robotic drill in a first mode.

FIG. 4 is a schematic flow diagram illustrating a method of operation of the system 300 in a first mode, in which a bias is measured and determined for each of a plurality of predetermined drilling locations on a workpiece. In a first step 401, the robotic drill is actuated to contact the surface of the workpiece contacting portion of the clamp to the workpiece to be machined. In a second step 402, a first position of the drilling tool relative to the workpiece is measured using the metrology system. In a third step 403, the servo motor is actuated to drive the clamp on to the workpiece to be machined, while measuring a force from the force sensor until a predetermined force has been reached. In a fourth step 404, a second position of the drilling tool relative to the workpiece is measured using the metrology system. In a fifth step 405, a bias is determined from a difference between the first and second measured positions. In a sixth step 406, the determined bias is stored for the predetermined location. The method may then be repeated for further predetermined locations on the workpiece until all locations for drilling operations have been covered.

Figure 5:
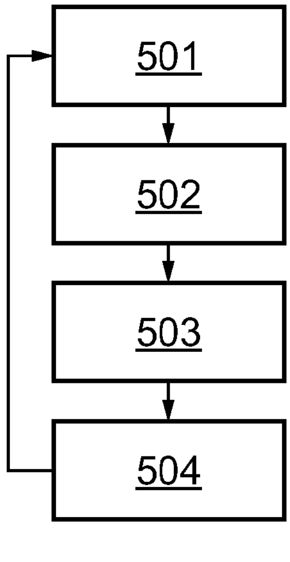
FIG. 5 is a schematic flow diagram of an example method of operating a robotic drill in a second mode.

In a second mode of operation, the controller may perform the method as outlined in FIG. 5. In a first step 501, a stored bias for a predetermined location of a workpiece to be machined is retrieved. In a second step 502, the robotic drill is actuated to contact the surface of the workpiece contacting portion of the clamp at the predetermined location offset by the retrieved bias. In a third step 503, the servo motor is actuated to drive the clamp on to the workpiece while measuring a force from the force sensor until a predetermined force has been reached. In a fourth step 504, the drilling tool is operated to drill a hole at the predetermined location of the workpiece. The method may then be repeated until all locations for drilling have been covered. The position of the drilling tool may continue to be measured during the second mode of operation, which can be used to update a stored bias for the predetermined location.

The second mode of operation may be carried out separately from the first mode, i.e. with the stored bias for each predetermined location having been previously determined.

The optical metrology system may operate by locating the position of multiple LEDs on the drilling tool 201 and workpiece holder 302 so that when the robotic drill 301 performs a drilling operation the optical metrology system enables the drilling tool to drill a hole in the workpiece to a greater degree of accuracy than may be possible using positional encoders on the robotic drill alone. The optical metrology system may for example have a positional accuracy within around 0.1 mm of a nominal target position, The bias between an unclamped and clamped position can be used by the controller to predict what bias or offset to apply to the robotic drill for future drilling operations. Multiple bias measurements may be incorporated into a machine learning algorithm to predict a bias to be used for a robotic drilling system.

Figure 6:
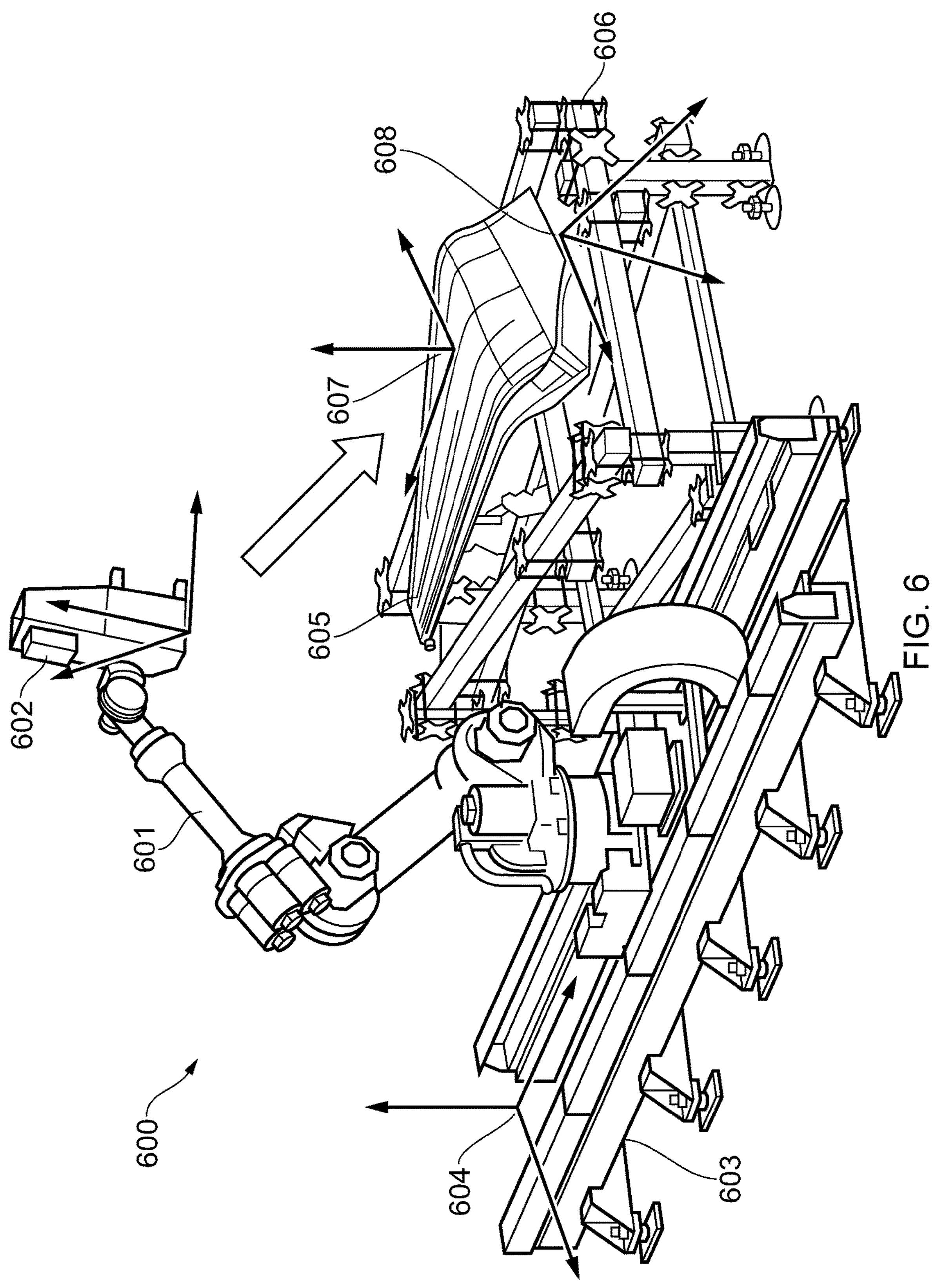
FIG. 6 is a diagram of an example robotic drilling system.

FIG. 6 is a drawing indicating various component parts of an example robotic drilling system 600, including a robotic drill 601 with a tool frame 602 comprising a drilling tool and clamp of the type described above. The robotic drill 601 is mounted on a robot base frame 603 that is associated with a robot system origin 604. A workpiece 605 to be machined is mounted on a workpiece holder 606, which may be attached to the robot base frame 603. In operation, the robot tool frame 602 is moved from the system origin 604 to a target 607, which may be determined by a 3D CAD model relative to an origin 608 of the workpiece 605 or workpiece holder 606. Operation of the robotic drill 601 may then be as described above.

Figure 7:
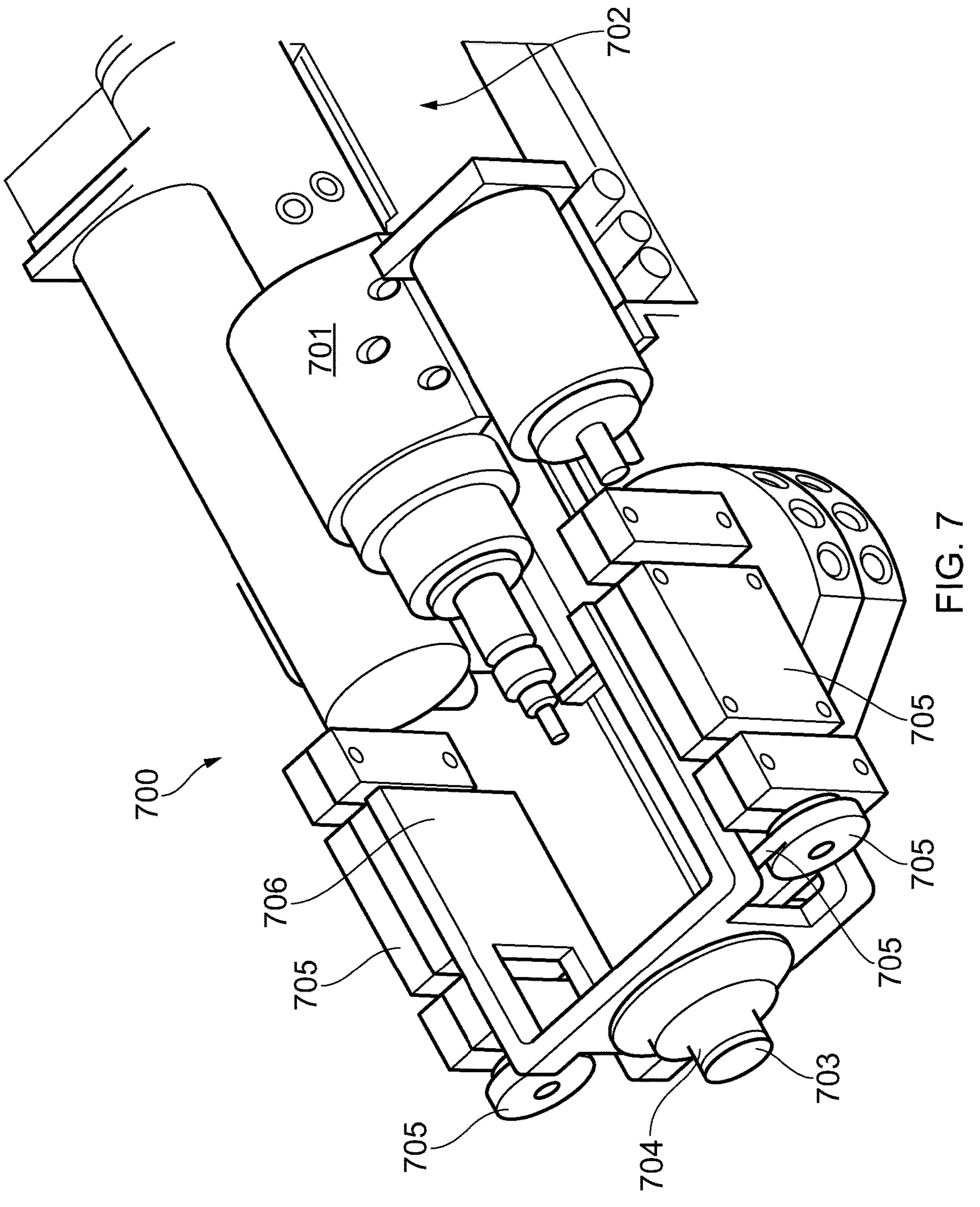
FIG. 7 is a diagram of an example clamp attached to a drilling tool of a robotic drill.

FIG. 7 illustrates a more detailed example of a clamp attached to a drilling tool 700 of a robotic drill 701, the clamp having the general form as shown in FIG. 2 and described above. The clamp comprises an electro-mechanical servo-driven mechanism 702 for high precision clamp-up, and has a non-skid surface 703 at the clamp "nose", or workpiece contacting portion. An integrated force feedback system 704 enables the servo to be driven until a desired force is met. Linear rails 705 with a pulley or timing belt ensure that force is applied to the structure, i.e. the workpiece to be machined, that is central to the clamp nose and not offset, which can amplify any skid. A rigid C-shaped frame 706 is designed to prevent distortion, deflection and skid of the clamp nose.

Other embodiments are intentionally within the scope of the invention as defined by the appended claims.

The invention claimed is:

1. A clamp configured for attachment to a drilling tool of a robotic drill, the clamp comprising:

an attachment portion configured for attachment to the drilling tool;

a frame linearly moveable relative to the attachment portion along a central axis of the clamp concentric with a drilling direction of the drilling tool, wherein the frame has a pair of arms extending in the drilling direction on either side of the central axis and a distal end piece extending between the pair of arms;

an actuation mechanism comprising a servo motor configured to drive linear movement of the frame relative to the drilling tool, wherein the servo motor is configured to drive each of the arms of the frame by rotation of respective rods extending along each arm;

a workpiece contacting portion at a distal end of the frame, comprising a surface for contacting a surface of a workpiece to be drilled and an aperture allowing for passage of a drill bit of the drilling tool through to the workpiece surface; and a force sensor arranged to measure a force acting on the workpiece contacting portion in the drilling direction.

2. The clamp of claim 1, wherein the workpiece contacting portion has a non-slip surface for contacting the workpiece surface.

3. The clamp of claim 1, wherein the arms and end piece are of unitary construction.

4. The clamp according to claim 1, comprising a pulley or timing belt extending between the pair of arms arranged to synchronise rotation of the rods.

5. A robotic drilling system, comprising:

a robotic drill having a drilling tool;

a workpiece holder for holding a workpiece to be machined;

a clamp attached to the drilling tool, the clamp comprising:

an attachment portion attached to the drilling tool;

a frame linearly moveable relative to the attachment portion along a central axis of the clamp concentric with a drilling direction of the drilling tool;

an actuation mechanism comprising a servo motor configured to drive linear movement of the frame relative to the drilling tool;

a workpiece contacting portion at a distal end of the frame, comprising a surface for contacting a surface of a workpiece to be drilled and an aperture allowing for passage of a drill bit of the drilling tool through to the workpiece surface; and a force sensor arranged to measure a force acting on the workpiece contacting portion in the drilling direction, the robotic drilling system further comprising:

a controller connected and arranged for control of the robotic drill and clamp, wherein the controller is configured to:

actuate the robotic drill to contact the surface of the workpiece contacting portion of the clamp with a workpiece to be machined;

actuate the servo motor to drive the clamp on to the workpiece while measuring a force from the force sensor until a predetermined force has been reached; and operate the drilling tool to drill a hole into the workpiece.

6. The robotic drilling system of claim 5 further comprising a metrology system for measuring a position of the drilling tool relative to the workpiece to be machined.

7. The robotic drilling system of claim 6, wherein the metrology system comprises a first plurality of datums located on the robotic drill and a second plurality of datums located on the workpiece holder.

8. The robotic drilling system of claim 7, wherein the controller is configured to receive signals from the first and second plurality of datums to determine a position of the drilling tool relative to the workpiece.

9. The robotic drilling system of claim 8, wherein the metrology system is an optical metrology system, and the first and second plurality of datums comprise optical emitters, the metrology system comprising a plurality of optical sensors arranged to determine a position of the tool relative to the workpiece holder based on signals received by the optical sensors from the first and second plurality of optical emitters.

10. The robotic drilling system of claim 6 wherein, in a first mode, the controller is configured to:

actuate the robotic drill to contact the surface of the workpiece contacting portion of the clamp with a predetermined location on the workpiece to be machined;

measure a first position of the drilling tool relative to the workpiece with the metrology system;

actuate the servo motor to drive the clamp on to the workpiece while measuring a force from the force sensor until a predetermined force has been reached;

measure a second position of the drilling tool relative to the workpiece with the metrology system;

determine a bias from a difference between the first and second measured positions; and store the determined bias for the predetermined location.

11. The robotic drilling system of claim 10, wherein the controller is configured to determine and store a bias for a plurality of predetermined locations on the workpiece.

12. The robotic drilling system of claim 6, wherein in a second mode, the controller is configured to:

retrieve a stored bias for a predetermined location of a workpiece to be machined;

actuate the robotic drill to contact the surface of the workpiece contacting portion of the clamp at the predetermined location offset by the retrieved bias;

actuate the servo motor to drive the clamp on to the workpiece while measuring a force from the force sensor until a predetermined force has been reached; and operate the drilling tool to drill a hole at the predetermined location of the workpiece.

13. The robotic drilling system of claim 12 wherein the controller is configured to measure a position of the drilling tool after actuating the servo motor and to update the stored bias for the predetermined location.

* * * * *